(12) United States Patent
Yamada (10) Patent No.: US 7,456,900 B2
(45) Date of Patent: Nov. 25, 2008

(54) STROBE UNIT AND STROBE UNIT CONTROL METHOD

(75) Inventor: Masanori Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 883 days.

(21) Appl. No.: 10/956,295

(22) Filed: Oct. 1, 2004

(65) Prior Publication Data

US 2005/0078955 A1 Apr. 14, 2005

(30) Foreign Application Priority Data

Oct. 14, 2003 (JP) ............................. 2003-353315
Sep. 14, 2004 (JP) ............................. 2004-266195

(51) Int. Cl.
*H04N 5/222* (2006.01)
(52) U.S. Cl. ..................................... 348/371
(58) Field of Classification Search ................ 348/370, 348/371, 240; 396/180
See application file for complete search history.

(56) References Cited

U.S. PATENT DOCUMENTS 5,296,889 A * 3/1994 Imai ............................. 396/48
5,819,122 A * 10/1998 Kageyama et al. ............ 396/85
6,535,692 B2 * 3/2003 Nakanishi et al. ........... 396/159

FOREIGN PATENT DOCUMENTS

JP 2503522 Y 7/1996

* cited by examiner

*Primary Examiner*—Lin Ye
*Assistant Examiner*—Trung Diep
(74) *Attorney, Agent, or Firm*—Canon U.S.A. Inc., I.P. Division (57) ABSTRACT

Provided is a strobe unit compatible with both a camera that has a synchro switch that does not cause chattering and that can achieve a large number of times of flash photography per unit time and a camera that has a synchro switch whose chattering time is long or short. The strobe unit comprises: a chattering preventing unit that is connected to a flashlight emission initiating unit; a checking unit that checks the type of synchro switch included in an image sensing apparatus, which is connected to the strobe unit via a communication terminal, through transfer of information with the image sensing apparatus; and a control unit that controls the chattering preventing unit according to the result of checking performed by the checking unit.

8 Claims, 8 Drawing Sheets

STROBE UNIT AND STROBE UNIT CONTROL METHOD

CROSS-REFERENCE TO RELATED APPLICATIONS

This application claims priority from Japanese Patent Application Nos. 2003-353313 filed Oct. 14, 2003 and 2004-266195 filed Sep. 14, 2004, which are hereby incorporated by reference.

BACKGROUND OF THE INVENTION

1. Field of the Invention

The present invention relates to a strobe unit that is used while being connected to a camera which adopts a film or an imaging device as a recording medium, and a strobe unit control method.

2. Description of the Related Art

In general, strobe units include a chattering preventing unit connected to a flashing initiating unit. This is because the strobe unit is designed on the assumption that a camera including a mechanical synchro switch may be connected thereto. Specifically, if the synchro switch of a camera is a mechanical switch, chattering occurs for some time. A strobe unit that does not include the chattering preventing unit may erroneously initiate flashing a plurality of times. In order to prevent this kind of incident, the chattering preventing unit is included. Namely, when the synchro switch is turned on for the first time, the chattering preventing unit enables initiation of flashing. However, even if the on and off states of the synchro switch are repeated thereafter for a predetermined period of time, the chattering unit ignores the repeated switching of the on and off states. In general, cameras have the predetermined time set to 100 milliseconds.

In general, the predetermined time is called a chattering prevention time. Even when the mechanical synchro switch is adopted, if a high-performance mechanical synchro switch is employed despite a high cost, a chattering time during which chattering is under way can be shortened to 50 milliseconds or less. However, when a camera in which the chattering prevention time is set to 100 milliseconds is employed, an interval between flashings performed by a strobe unit during continuous photography is limited to a time permitting ten flashings per second in order to guarantee that the foregoing incident will not occur. The same applies to a case where a camera in which the chattering prevention time is set to 50 milliseconds or less is employed or a camera including a semiconductor synchro switch to be described below is employed. For the foregoing reason, the upper limit of the interval between emissions of flashlight during continuous flash photography is the time permitting ten flashlight emissions per second. Moreover, the camera including the semiconductor synchro switch has already been put on the market. Since the upper limit of the interval between flashings performed by a strobe unit is the time permitting ten flashings per second, even if a camera has the ability to perform flash photography ten or more times per second, the camera is designed to confine the number of times of flash photography to about ten times per second.

Aside from the foregoing strobe unit, devices including a chattering preventing facility are described in, for example, Japanese Utility Model application No. 2503522. For example, Japanese Utility Model Application No. 2503522 discloses a remote control unit using a xenon flash tube. In a case where the chattering preventing facility is implemented in the remote control unit, when a transmitter receives a signal via an X sync contact in a camera (equivalent to a mechanical synchro switch employed in an embodiment of the present invention), a chattering cancellation circuit cancels chattering. The transmitter transmits an optical pulsating signal to a flashing control circuit according to an output signal of the chattering cancellation circuit so as to cause the xenon flash tube to emit flashlights a plurality of times. A receiver receives the optical pulsating signal and controlled equipment connected to an output terminal of the receiver (equivalent to a strobe unit in accordance with the embodiment of the present invention) is activated. Moreover, the Japanese Utility Model Application No. 2503522 describes a case where the remote control unit is used as a relay. In this case, the output terminal of the receiver and the input terminal of the transmitter are linked by a cable. The receiver transfers a received optical pulsating signal to the flashing control circuit via bypass unit, which allows a signal to bypass the chattering cancellation circuit, by way of the output terminal, cable, and input terminal. This causes the flash tube to emit flashlight according to the received optical pulsating signal.

Namely, when the transmitter is connected to a camera, the chattering cancellation circuit is employed. When the remote control unit is used as the relay, the chattering cancellation circuit is bypassed. A user manually designates whether the chattering cancellation circuit is employed or bypassed.

In efforts to overcome the aforesaid drawback of the conventional strobe unit, namely, the drawback that when a strobe unit is designed to be connectable to both of a camera having a semiconductor synchro switch and a camera having a mechanical synchro switch, the upper limit of the interval between flashings is the time permitting about ten flashings per sec because of the inclusion of the chattering preventing unit, conceivably, whether the chattering cancellation circuit is used is manually designated as it is proposed in relation to the remote control unit.

Moreover, when a strobe unit is designed to be connectable to both cameras that have a mechanical synchro switch but are different from each other in a chattering time during which chattering is under way, what is conceived in order to overcome the drawback that the upper limit of the interval between flashings is the time permitting ten flashings per sec is to manually switch chattering cancellation circuits that are set to different chattering prevention times.

Namely, when a camera having a mechanical synchro switch is connected to a strobe unit, a chattering preventing unit is activated according to a chattering time during which chattering of the mechanical synchro switch is under way. When a camera having a semiconductor synchro switch is connected to the strobe unit, the chattering preventing unit is inactivated. Thus, whether the chattering preventing unit is activated may be manually designated.

However, when a user can freely switch the activation and inactivation of the chattering preventing unit, the user may find it annoying to switch the activation and inactivation. Moreover, there is a fear that the switching may be performed improperly. Flash photography may not be achieved in a desired manner. Furthermore, the inclusion of a switch for use in switching the activation and inactivation will discourage the efforts to compactly design a strobe unit or a camera at a low cost.

SUMMARY OF THE INVENTION

The present invention addresses the above-identified problems by providing a strobe unit that is compatible with both a camera having a semiconductor synchro switch that enables a larger number of times of flash photography per unit time and a camera having a mechanical synchro switch whose chattering time is long or short. Also provided is a strobe unit control method.

According to an aspect of the present invention, a strobe unit comprises: a flashlight emission initiating unit that transmits a signal to a flashing unit to cause the flashing unit to flash; a chattering preventing unit connected to the flashlight emission initiating unit; a communication terminal connectable to an image sensing apparatus; a checking unit connected to the communication terminal that checks the type of synchro switch included in the image sensing apparatus through transfer of information with the image sensing apparatus through the communication terminal; and a control unit connected to the chattering preventing unit and the checking unit that controls the chattering prevention unit based on a result of checking performed by the checking unit.

According to another aspect of the present invention, a strobe unit control method for a strobe unit connectable to an image sensing apparatus comprises: receiving information from the image sensing apparatus comprising information for determining a type of synchro switch included in the image sensing apparatus; determining the type of synchro switch included in the image sensing apparatus; and determining parameters for preventing chattering based on the information received from the image sensing apparatus. The strobe unit control method may further comprise preventing chattering based on the parameters for preventing chattering.

Further features and advantages of the present invention will become apparent from the following description of the embodiments (with reference to the attached drawings).

DESCRIPTION OF THE PREFERRED EMBODIMENTS

An exemplary embodiment of the present invention is described below.

Figure 1:
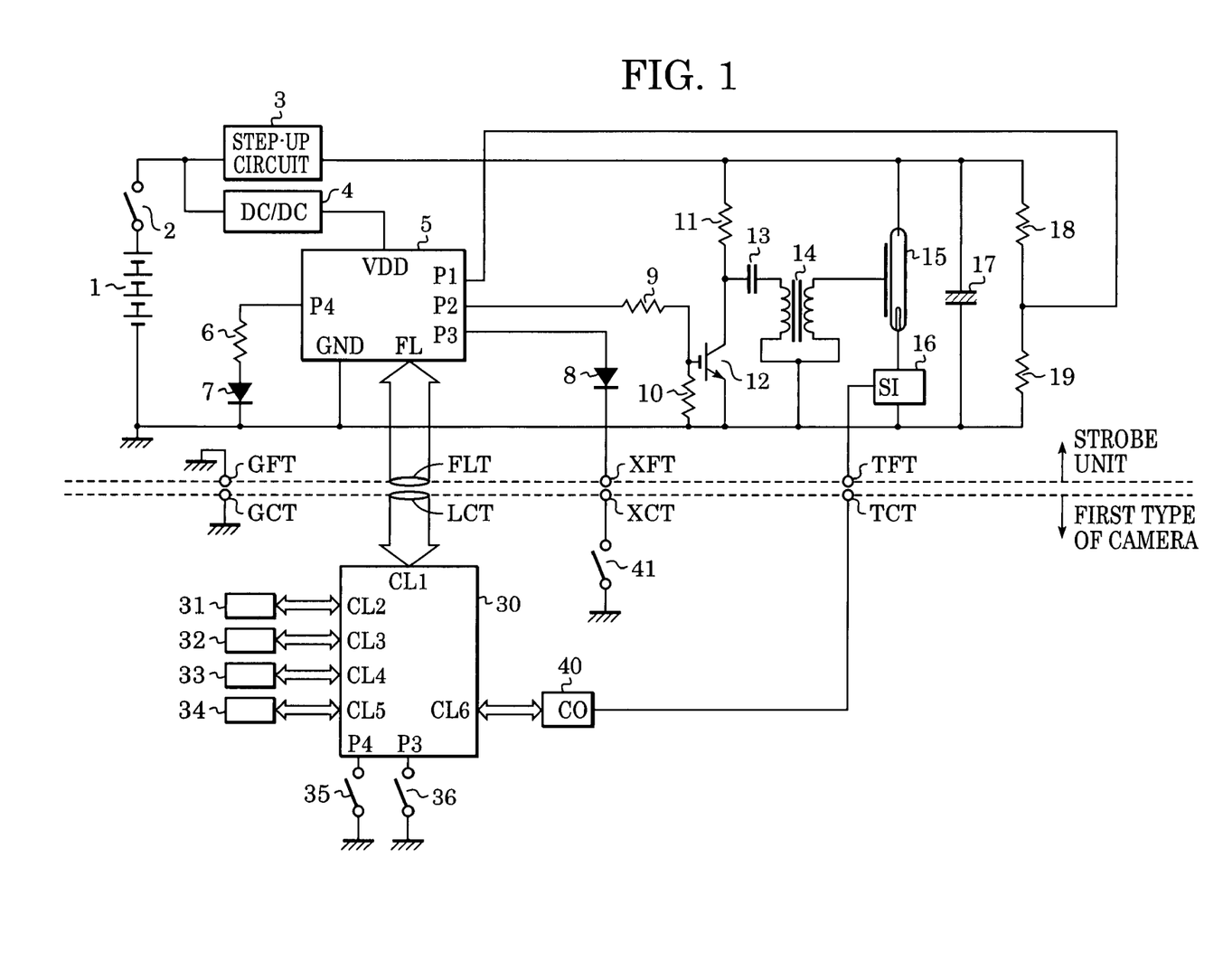
FIG. 1 is a circuit diagram showing the configuration of a strobe unit in accordance with an embodiment of the present invention and the configuration of a first type of camera.
Figure 2:
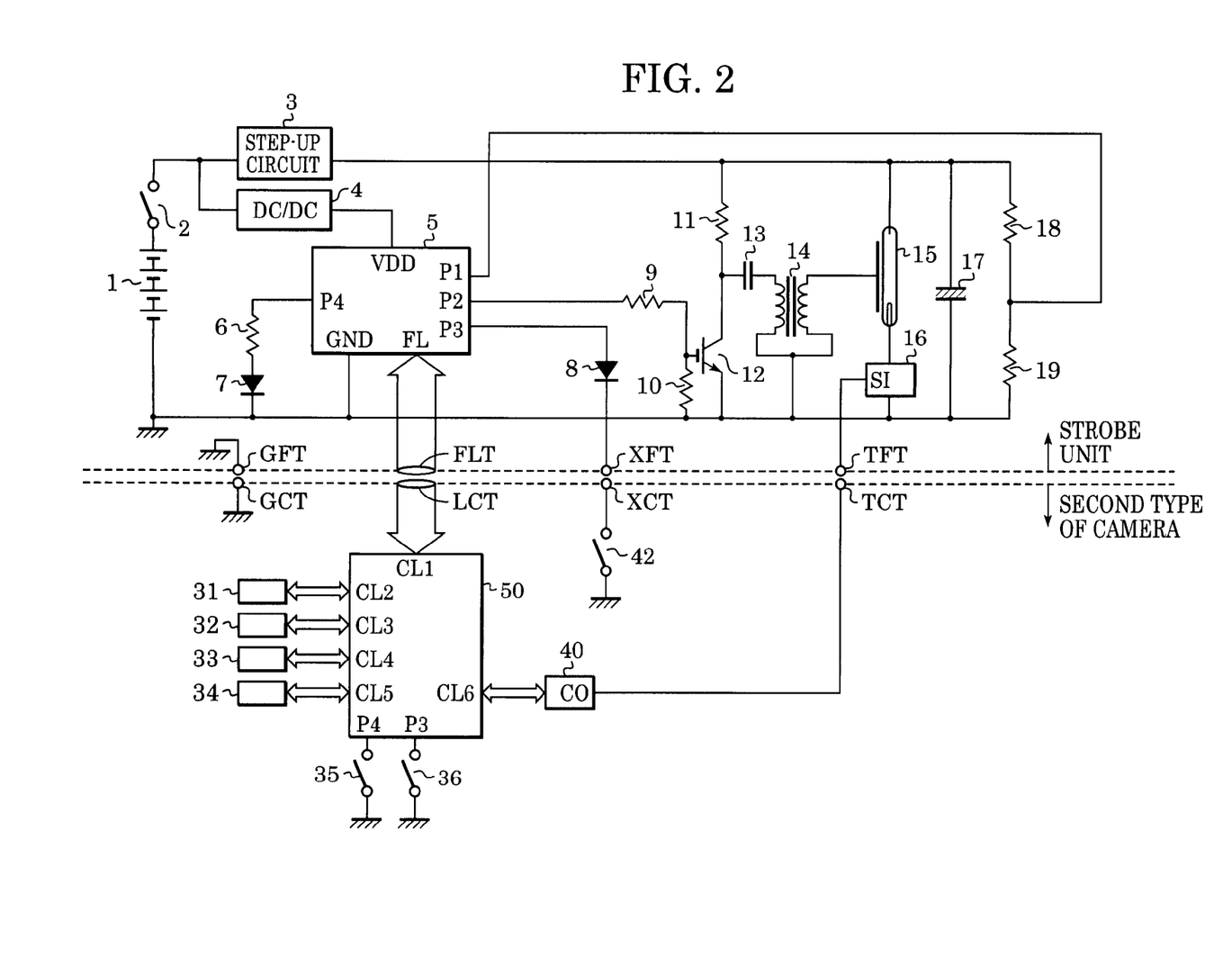
FIG. 2 is a circuit diagram showing the configuration of the strobe unit in accordance with the embodiment of the present invention and the configuration of a second type of camera.
Figure 3:
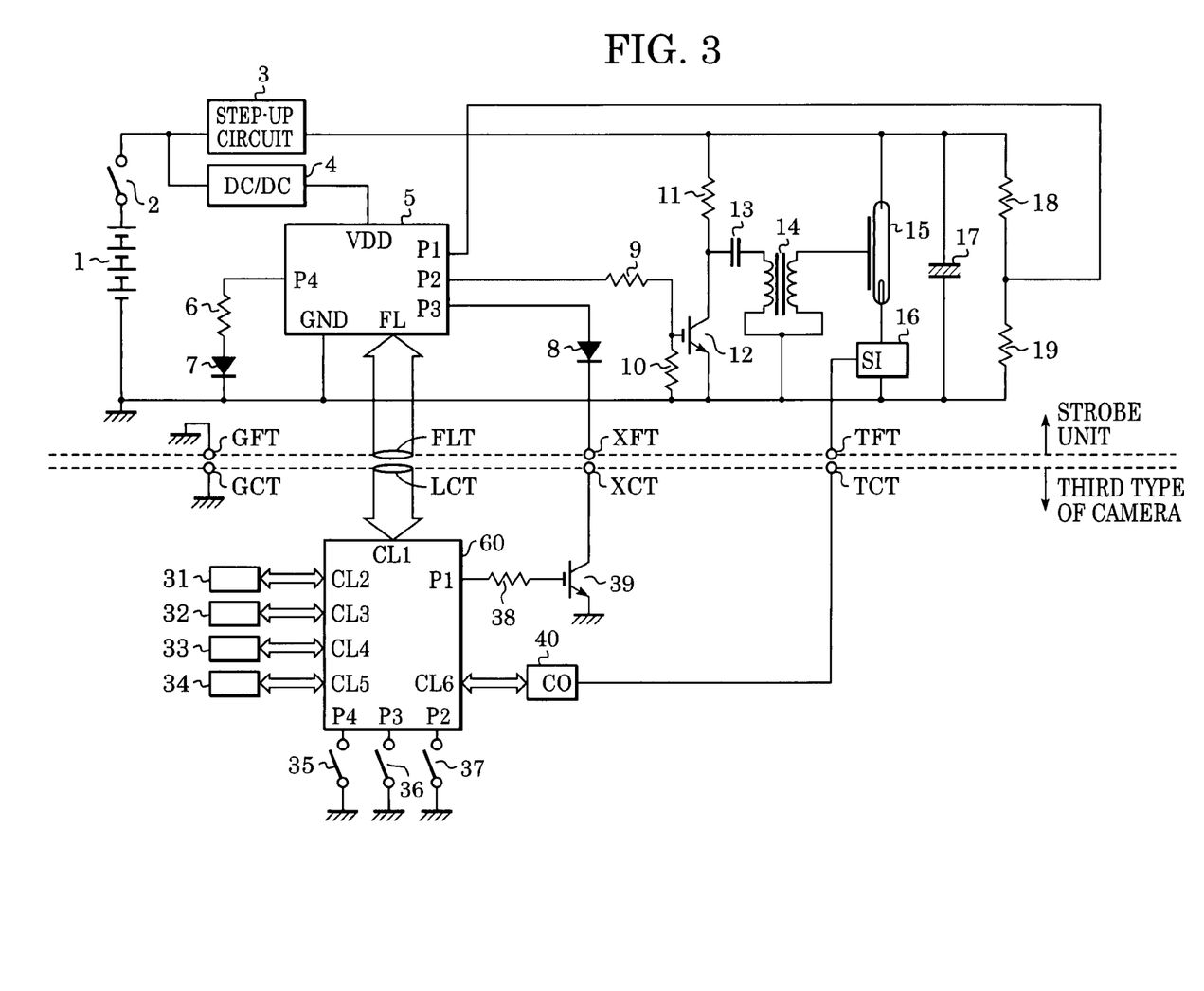
FIG. 3 is a circuit diagram showing the configuration of the strobe unit in accordance with the embodiment of the present invention and the configuration of a third type of camera.

FIG. 1 to FIG. 3 show the circuitry of a strobe unit in accordance with an embodiment of the present invention and the circuitries of different types of cameras connectable to the strobe unit (first type of camera (FIG. 1), second type of camera (FIG. 2), and third type of camera (FIG. 3). The first and second types of cameras (FIG. 1 and FIG. 2) are cameras having a mechanical synchro switch, and the third type of camera (FIG. 3) is a camera having a semiconductor synchro switch.

To begin with, the circuitry of a strobe unit and the circuitry of a first type of camera having a mechanical synchro switch are described in conjunction with FIG. 1. An upper portion of FIG. 1 (above a dashed line) shows the circuitry of the strobe unit, and a lower portion (below a dashed line) thereof shows the circuitry of the first type of camera having a mechanical synchro switch.

First, the circuitry of the strobe unit will be described. The strobe units shown in FIG. 1 to FIG. 3 share the same circuitry. Shown in the strobe unit are a supply battery 1 and a power switch 2. One of the terminals of the power switch 2 is connected to the positive electrode of the supply battery 1 and the other terminal is connected to the input terminals of a step-up circuit 3. The strobe unit also includes a dc-to-dc converter 4 that will be described later. The step-up circuit 3 has the input terminal thereof connected to the power switch 2, and has the output terminal thereof connected to the positive electrode of a main capacitor 17 that will be described later. The step-up circuit 3 charges the main capacitor 17 so that as high a voltage as approximately 330 V will be developed at the main capacitor. The dc-to-dc converter 4 has the input terminal thereof connected to one terminal of the power switch 2 and has the output terminal thereof connected to the power terminal VDD of a microcomputer 5 that will be described later. The microcomputer 5 has the power terminal VDD thereof connected to the output terminal of the dc-to-dc converter 4, and has the ground terminal GND thereof connected to the negative electrode of the supply battery 1. The microcomputer 5 has ports P1, P2, P3, and P4 as well as a group of communication ports FL via which it communicates with a camera. A resistor 6 has one terminal thereof connected to the port P4 of the microcomputer 5, and has the other terminal thereof connected to the anode of an LED 7 that will be described later. When charging of the main capacitor 17 (described later) is completed, the light-emitting diode (LED) 7 is lit in order to notify a user of the completion of charging of the main capacitor 17. The anode of the LED 7 is connected to the resistor 6, and the cathode thereof is connected to the negative electrode of the supply battery 1. A diode 8 has the anode thereof connected to the port P3 of the microcomputer 5, and has the cathode thereof connected to the terminal XFT via which the microcomputer 5 is connected to a camera. The inclusion of the diode 8 is intended to prevent breakdown of the microcomputer 5 due to a high voltage when the strobe unit is attached to an accessory shoe of a camera having a so-called synchro PC terminal or when a so-called high-voltage synchro strobe unit is connected via a PC terminal.

A resistor 9 has one terminal thereof connected to the port P2 of the microcomputer 5 and has the other terminal thereof connected to the gate of an insulated-gate bipolar transistor (IGBT) 12 that will be described later. A resistor 10 has one terminal thereof connected to the gate of the IGBT 12 that will be described later and has the other terminal thereof connected to the negative electrode of the supply battery 1. A resistor 11 has one terminal thereof connected to the collector of the IGBT 12 and has the other terminal thereof connected to the positive electrode of the main capacitor 17. The connection terminal XFT is a synchro terminal of the strobe unit and connected to a synchro terminal XCT that is included in the accessory shoe of a camera and that will be described later. The IGBT 12 has the gate thereof connected to a node between the resistors 9 and 10, has the collector thereof connected to one terminal of the resistor 11, and has the emitter thereof connected to the negative electrode of the supply battery 1. A trigger capacitor 13 has one terminal thereof connected to the collector of the IGBT 12 and has the other terminal thereof connected to one end of the primary winding of a trigger transformer 14. The trigger transformer 14 has one end of the primary winding thereof connected to one terminal of the trigger capacitor 13, has one end of the secondary winding thereof connected to a trigger electrode of a flash tube 15 that will be described later, and has a contact between the primary and secondary windings thereof connected to the emitter of the IGBT 12.

The IGBT 12, resistor 11, trigger capacitor 13, and trigger transformer 14 constitute a flashlight emission initiating unit. Herein, for example, the resistance of the resistor 11 is set to 100 kΩ and the capacitance of the trigger capacitor 13 is set to 0.047 μF. The settings enable the flashlight emission initiating unit to repeatedly act one hundred times per second.

The flash tube 15 has the anode thereof connected to the positive electrode of the main capacitor 17 and has the cathode thereof connected to one terminal of a flashlight control circuit 16 that will be described later. The flashlight control circuit 16 has one terminal thereof connected to the cathode of the flash tube 15, has the other terminal thereof connected to the negative electrode of the main capacitor 17, and has the control terminal SI thereof connected to a light adjustment circuit 40, which is included in a camera and will be described later, via terminals TFT and TCT. Moreover, when a low-level signal is applied as an input to the control terminal SI of the flashlight control circuit 16, the flashlight control circuit 16 enters the off state so as to disable flowing of a flashlight current. When a high-level signal is applied as an input to the control terminal SI, the flashlight control circuit 16 enters the on state so as to enable flowing of the flashlight current. A resistor 18 has one terminal thereof connected to the positive electrode of the main capacitor 17 and has the other terminal thereof connected to a resistor 19 that will be described later. The resistor 19 has one terminal thereof connected to one terminal of the resistor 18 and has the other terminal thereof connected to the negative electrode of the main capacitor 17. A node between the resistors 18 and 19 is connected to the port P1 of the microcomputer 5. A terminal GFT is grounded and connected to a camera ground terminal CGT that will be described later. A group of communication terminals FLT is connected to a group of communication terminals LCT incorporated in a camera, and connected to the group of ports FL of the microcomputer 5.

The circuitry of the first type of camera having a mechanical synchro switch shown in the lower portion of FIG. 1 (below the dashed line) is described next.

A microcomputer 30 included in a camera has a plurality of groups of ports and a plurality of ports. The groups of ports and the ports will be described later. An iris diaphragm control circuit 31 is connected to the microcomputer 30 via a group of ports CL2. A shutter control circuit 32 is connected to the microcomputer 30 via a group of ports CL3. A film feed circuit 33 is connected to the microcomputer 30 via a group of ports CL4. A mode designation circuit 34 is connected to the microcomputer 30 via a group of ports CL5. The microcomputer 30, iris diaphragm control circuit 31, shutter control circuit 32, film feed circuit 33, and mode designation circuit 34 are powered from a supply battery that is not shown. A switch 35 is turned on with a shutter button of the camera pressed halfway. The switch 35 has one terminal thereof connected to a port P4 of the microcomputer 30 and has the other terminal grounded. A switch 36 is turned on with the shutter button of the camera pressed fully. The switch 36 has one terminal thereof connected to a port P3 of the microcomputer 30 and has the other terminal thereof grounded.

A light adjustment circuit 40 is connected to the microcomputer 30 via a group of ports CL6, and has an output terminal CO thereof connected to the control terminal SI of the flashlight control circuit 16 via the terminal TCT and the terminal TFT of the strobe unit. Immediately after a shutter initiates opening, the output terminal CO of the light adjustment circuit 40 makes a low-to-high transition. When a measured value of light reflected from an object illuminated with flashlight reaches a predetermined value, the output terminal CO makes a high-to-low transition. A mechanical synchro switch 41 is connected to a synchro terminal XCT. When the shutter is fully opened, the mechanical synchro switch 41 is turned on.

Actions to be performed when the strobe unit having the configuration shown in FIG. 1 is connected to the first type of camera are described below. The actions are further described later in conjunction with the flowchart of FIG. 4.

To begin with, actions to be performed in the strobe unit shown in FIG. 1 are described below. When the power switch 2 is turned on, the step-up circuit 3 and dc-to-dc converter 4 are started. When charging the main capacitor 17 is initiated, the microcomputer 5 has a voltage applied to the terminal VDD thereof and starts. The actions of the microcomputer 5 will be detailed in conjunction with FIG. 4 or FIG. 6. The microcomputer 5 communicates with the microcomputer 30, which is included in the first type of camera connected to the strobe unit via the groups of terminals FLT and LCT, via the group of ports FL in the microcomputer 5 and the group of terminals CL1 of the microcomputer 30. When the microcomputer 5 verifies that the camera is of the first type having a mechanical synchro switch, the microcomputer 5 activates a chattering preventing unit included therein. Moreover, the microcomputer 5 detects the voltage at the node between the resistors 18 and 19 via the port P1. When the voltage at the main capacitor 17 reaches a predetermined value suitable for flashing of the flash tube 15, the microcomputer 5 drives the port P4 to a high level. Thus, the LED 7 is lit. Herein, in general, when the voltage at the main capacitor 17 reaches the predetermined value, if the LED 7 is lit, it is said that charging the main capacitor 17 is completed.

As described in conjunction with the flowchart of FIG. 4 later, when the mechanical synchro switch 41 included in the camera is turned on with the LED 7 lit, the port P3 of the microcomputer 5 makes a high-to-low transition and the port P2 thereof makes a low-to-high transition. A voltage having the high level is applied to the gate of the IGBT 12, and the flashlight emission initiating unit is activated. A high-frequency high voltage is developed at the output terminal of the secondary winding of the trigger transformer 14, and applied to the trigger electrode of the flash tube 15. This causes the flash tube 15 to initiate gaseous discharge. Before the mechanical synchro switch 41 in the first type of camera is turned on, the light adjustment circuit 40 in the camera transmits a high-level signal which brings the flashlight control circuit 16 to the on state. Therefore, the flash tube 15 initiates flashing.

Thereafter, when the light adjustment circuit 40 transmits a low-level signal, a low-level signal is applied as an input to the control terminal SI of the flashlight control circuit 16. A flashlight current flowing through the flash tube 15 is cut off, and flashing is ceased. When an object is located at a near distance, if a voltage high enough to cause flashing remains in the main capacitor 17, the synchro switch may cause chattering. Nevertheless, the microcomputer 5 performs actions (as illustrated in the flowchart and described later) for fear flashing may be repeated a plurality of times. Thus, the microcomputer 5 includes the chattering preventing unit.

Next, actions to be performed in the first type of camera are described below. The actions will be further described later in conjunction with the flowchart of FIG. 5.

The first type of camera is set to a continuous photography mode by the mode designation circuit 35. Moreover, the number of times of photography per second to be attained by the camera in the flash photography mode is set to ten or less in consideration of the chattering of the mechanical synchro switch 41. When a power switch (not shown) is turned on, power is fed to the microcomputer 30 and to the other circuits. When the switch 35 is turned on, a camera identification (ID) number is transmitted to the strobe unit in order to inform the strobe unit of the fact that the camera is of the first type. Thereafter, if the strobe unit is in a charging-completed state, a photometry unit (not shown) is activated in order to determine an f-number and a shutter speed suitable for flash photography. Thereafter, when the switch 36 is turned on, a release sequence is initiated. The iris diaphragm control circuit 31 controls an iris diaphragm. Thereafter, the shutter control circuit 32 initiates opening of the shutter. Thereafter, the light adjustment circuit 40 is started, and the output terminal CO thereof is driven to a high level. When the shutter is fully opened, the synchro switch 41 is made. This causes the strobe unit to initiate flashing. When the output terminal CO of the light adjustment circuit 40 is driven to a low level, the flashing of the strobe unit is ceased.

Thereafter, the shutter is closed and the film feed circuit 33 winds up a film. Thereafter, the switch 36 is checked to see if it is on. If the switch 36 is on, the strobe unit is checked to see if it is in the charging-completed state. The foregoing actions are then repeated. The actions are repeated until the off state of the switch 36 is detected. After flash photography is performed, if the main capacitor 17 is in the charging-completed state, flash photography is repeated.

FIG. 2 shows the circuitry of the strobe unit in accordance with the first embodiment of the present invention described in conjunction with FIG. 1 and the circuitry of a second type of camera having a mechanical synchro switch and being connected to the strobe unit. Components bearing the same reference numerals as those of the first type of camera shown in FIG. 1 and described above have the same capabilities, and the description of the components will therefore be omitted here.

A microcomputer 50 is different from the microcomputer 30, which is included in the first type of camera, in terms of the contents of a ROM incorporated therein. A mechanical synchro switch 42 is connected to a synchro terminal XCT, and is turned on when a shutter is fully opened. The chattering time during which the chattering of the mechanical synchro switch 42 is under way is a half or less of the chattering time of the mechanical synchro switch 41 included in the first type of camera.

Actions to be performed in the strobe unit when the second type of camera is connected to the strobe unit are described below.

When the power switch 2 is turned on, the step-up circuit 3 and dc-to-dc converter 4 are started. Charging the main capacitor 17 is initiated. A voltage is applied to the terminal VDD of the microcomputer 5, and the microcomputer 5 is started. As described in conjunction with the flowchart of FIG. 4 later, the microcomputer 5 communicates with the microcomputer 50 included in the second type of camera, which is connected to the strobe unit via the groups of terminals FLT and LCT, via the group of terminals FL and the group of terminals CL1, and verifies that the camera is of the second type having a mechanical synchro switch. The microcomputer 5 then activates a chattering preventing unit included therein, and sets a chattering prevention time to a time shorter than the time set for the first type of camera. Moreover, the microcomputer 5 detects the voltage at the node between the resistors 18 and 19 via the port P1 thereof. When the voltage at the main capacitor 17 reaches a predetermined value suitable for flashing of the flash tube 15, the microcomputer 5 drives the port P4 to a high level. Consequently, the LED 7 is lit.

As described in conjunction with the flowchart of FIG. 4 later, when the mechanical synchro switch 42 included in the second type of camera is turned on in this state, the port P3 of the microcomputer 5 makes a high-to-low transition and the port P2 thereof makes a low-to-high transition. The high level persists for a predetermined time, e.g., 0.5 milliseconds (ms), which is much shorter than 100 ms. The voltage having the high level is applied to the gate of the IGBT 12. Consequently, the flashlight emission initiating unit is activated, and a high-frequency high voltage is developed at the output terminal of the secondary winding of the trigger transformer 14. The voltage is applied to the trigger electrode of the flash tube 15, and the flash tube 15 initiates gaseous discharge. Before the mechanical synchro switch 42 included in the second type of camera is turned on, the light adjustment circuit 40 included in the camera transmits a high-level signal which drives the flashlight control circuit 16 to the on state. The flash tube 15 therefore initiates flashing.

Thereafter, when the light adjustment circuit 40 transmits a low-level signal, an input signal applied to the control terminal SI of the flashlight control circuit 16 is driven to a low level. A flashlight current flowing through the flash tube 15 is cut off, and flashing is ceased. At this time, when an object is located at a near distance, if a voltage high enough to cause flashing remains in the main capacitor 17, the synchro switch may cause chattering. Nevertheless, the microcomputer 5 performs actions as described in the flowchart that will be described later for fear flashing may be repeated a plurality of times.

Actions to be performed in the second type of camera are described below. The actions will be further described in conjunction with the flowchart of FIG. 5 in the same manner as the actions to be performed in the first type of camera.

The second type of camera is set to a continuous photography mode by the mode designation circuit 34. Moreover, the number of times of photography per second or unit time to be attained by the camera in a flash photography mode is greater than that to be attained by the first type of camera and the number of times of photography per second is set to eleven or more. When the power switch (not shown) is turned on, power is fed to the microcomputer 50 and the other circuits. When the switch 35 is turned on, a camera ID number is transmitted to the strobe unit in order to inform the strobe unit of the fact that the camera is of the second type. Thereafter, if the strobe unit is in a charging-completed state, the photometry unit that is not shown is activated in order to determine an f-number and a shutter speed suitable for flash photography. Thereafter, when the switch 36 is turned on, a release sequence is initiated. The iris diaphragm control circuit 31 controls the iris diaphragm. Thereafter, the shutter control circuit 32 initiates opening of the shutter. Thereafter, the light adjustment circuit 40 is started and the output terminal CO thereof is driven to a high level. When the shutter is fully opened, the synchro switch 42 is made. This causes the strobe unit to initiate flashing. When the output terminal CO of the light adjustment circuit 40 is driven to a low level, the flashing of the strobe unit is ceased.

Thereafter, the shutter is closed, and the film feed circuit 33 winds up a film. Thereafter, the switch 36 is checked to see if it is turned on. If the switch 36 is on, the strobe unit is checked to see if it is in the charging-completed state. The foregoing actions are repeated. The repetition is continued until the off state of the switch 36 is detected. After flash photography is performed, if the main capacitor 17 is in the charging-completed state, flash photography is repeated.

FIG. 3 shows the circuitry of the strobe unit in accordance with the first embodiment of the present invention described in conjunction with FIG. 1 and the circuitry of a third type of camera having a semiconductor synchro switch and being connected to the strobe unit. Components bearing the same reference numerals as those of the first type of camera shown in FIG. 1 and described above have the same capabilities, and the description of the components will therefore be omitted here.

A microcomputer 60 is different from the microcomputer 30, which is included in the first type of camera, in terms of the contents of a ROM. A switch 37 remains on for a predetermined time after the shutter is fully opened by the shutter control circuit 32. An IGBT 39 serves as a semiconductor synchro switch and is connected to a synchro terminal XCT. The IGBT 39 is held in the on state for a predetermined time synchronously with the on state of the switch 37.

Now, actions to be performed in the strobe unit when the third type of camera is connected are described below.

When the power switch 2 is turned on, the step-up circuit and dc-to-dc converter 4 are started. Charging of the main capacitor 17 is initiated, and the microcomputer 5 is started with a voltage applied to the terminal VDD thereof. As described in conjunction with the flowchart of FIG. 4, the microcomputer 5 communicates with the microcomputer 60 included in the third type of camera, which is connected to the strobe unit via the groups of terminals FLT and LCT, via the groups of terminals FL and CL1. If the microcomputer 5 verifies that the camera is of the third type having a semiconductor synchro switch, the microcomputer 5 disables a chattering preventing unit included therein. The microcomputer 5 detects the voltage at the node between the resistors 18 and 19 via the port P1 thereof. If the voltage at the main capacitor 17 reaches a predetermined value suitable for flashing of the flash tube 15, the microcomputer 5 drives the port P4 thereof to a high level. Consequently, the LED 7 is lit.

As described later in conjunction with the flowchart of FIG. 4, if the semiconductor synchro switch 39 included in the third type of camera is turned on in this state, the port P3 of the microcomputer 5 makes a high-to-low transition, and the port P2 thereof makes a low-to-high transition. The high level persists for a predetermined time, e.g., 0.5 milliseconds (ms), which is much shorter than 100 ms. A voltage having the high level is applied to the gate of the IGBT 12. Consequently, the flashlight emission initiating unit is activated, and a high-frequency high voltage is developed on the output terminal of the secondary winding of the trigger transformer 14. The voltage is applied to the trigger electrode of the flash tube 15. This causes the flash tube 15 to initiate gaseous discharge. Before the semiconductor synchro switch (IGBT) 39 included in the third type of camera is turned on, a high-level signal which brings the flashlight control circuit 16 to the on state is applied to the light adjustment circuit 40 included in the camera. The flash tube 15 therefore initiates flashing.

Thereafter, when the light adjustment circuit 40 transmits a low-level signal, a low-level signal is applied as an input to the control terminal SI of the flashlight control circuit 16. Consequently, a flashlight current flowing through the flash tube 15 is cut off, and flashing is ceased. At this time, when an object is located at a near distance, even if a voltage high enough to cause flashing remains in the main capacitor 17, the semiconductor synchro switch 39 does not cause chattering. Therefore, flashing will not be repeated a plurality of times due to chattering.

Next, actions to be performed in the third type of camera are described below. The actions are further described later in conjunction with the flowchart of FIG. 6.

The third type of camera is set to a continuous photography mode by the mode designation circuit 34. Moreover, the number of times of photography per second, that is, per unit time to be attained by the camera in a flash photography mode is greater than that to be attained by the first type of camera, and the number of times of photography per second is set to eleven or more. When the power switch (not shown) is turned on, power is fed to the microcomputer 60 and the other circuits. When the switch 35 is turned on, a camera ID number is transmitted to the strobe unit in order to inform the strobe unit of the fact that the camera is of the third type. Thereafter, if the strobe unit is in a charging-completed state, the photometry unit (not shown) is activated in order to determine an f-number and a shutter speed suitable for flash photography. Thereafter, when the switch 36 is turned on, a release sequence is initiated. The iris diaphragm control circuit 31 controls an iris diaphragm. Thereafter, the shutter control circuit 32 initiates opening of the shutter. Thereafter, the light adjustment circuit 40 is started, and the output terminal CO thereof is driven to a high level. When the shutter is fully opened, the switch 37 is made. Responsively, the semiconductor synchro switch 39 is turned on. This causes the strobe unit to initiate flashing.

Thereafter, when the output terminal CO of the light adjustment circuit 40 is driven to a low level, the flashing of the strobe unit is ceased. Thereafter, the shutter is closed, and the film feed circuit 33 winds up a film. Thereafter, the switch 36 is checked to see if it is turned on. If the switch 36 is on, the strobe unit is checked to see if it is in the charging-completed state. The foregoing actions are then repeated. The repetition continues until the off state of the switch 36 is detected. After flash photography is performed, if the main capacitor 17 is in the charging-completed state, flash photography is repeated.

Figure 4A:
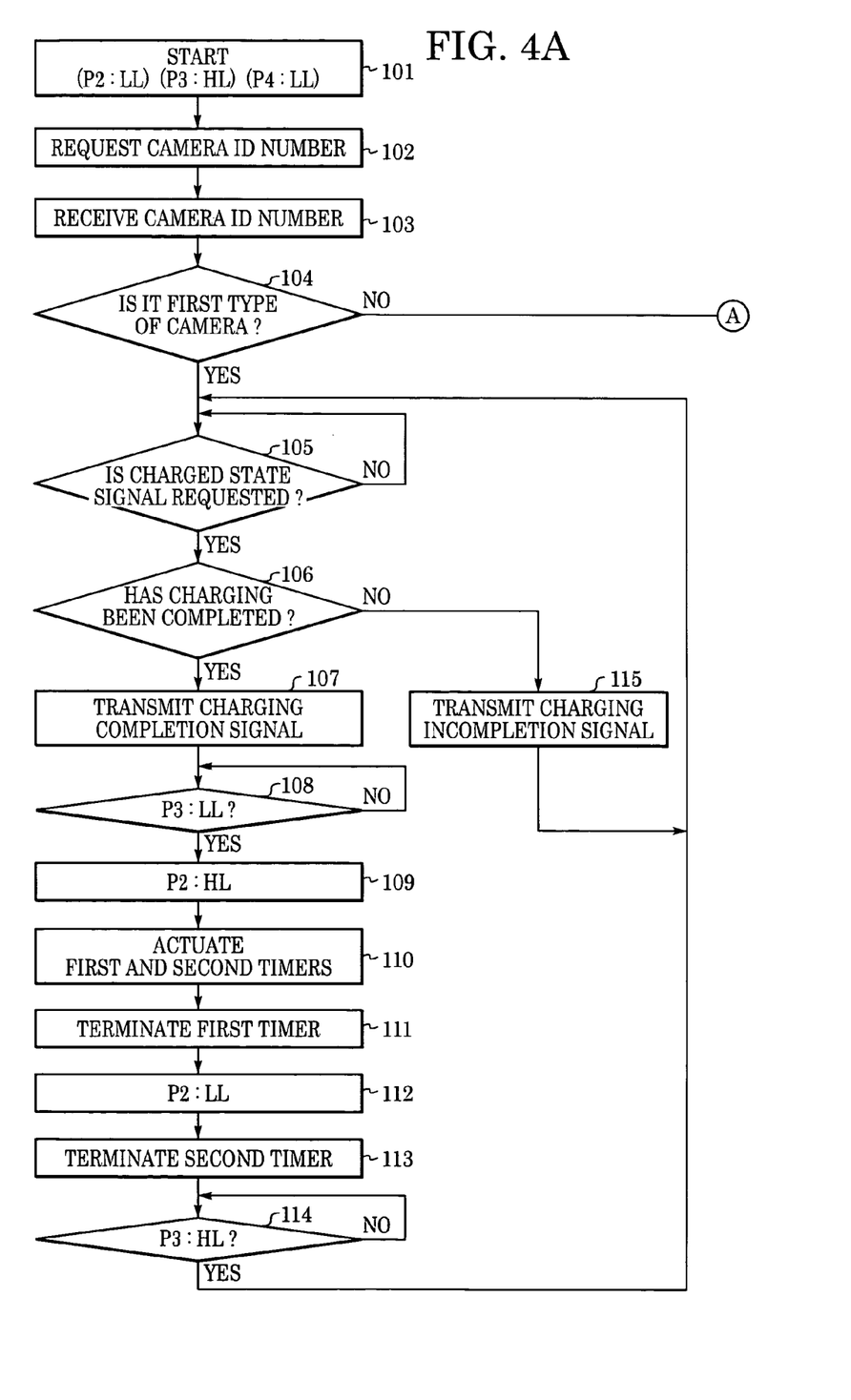
FIG. 4 is a flowchart illustrating actions to be performed in the strobe unit in accordance with the embodiment of the present invention.
Figure 4B:
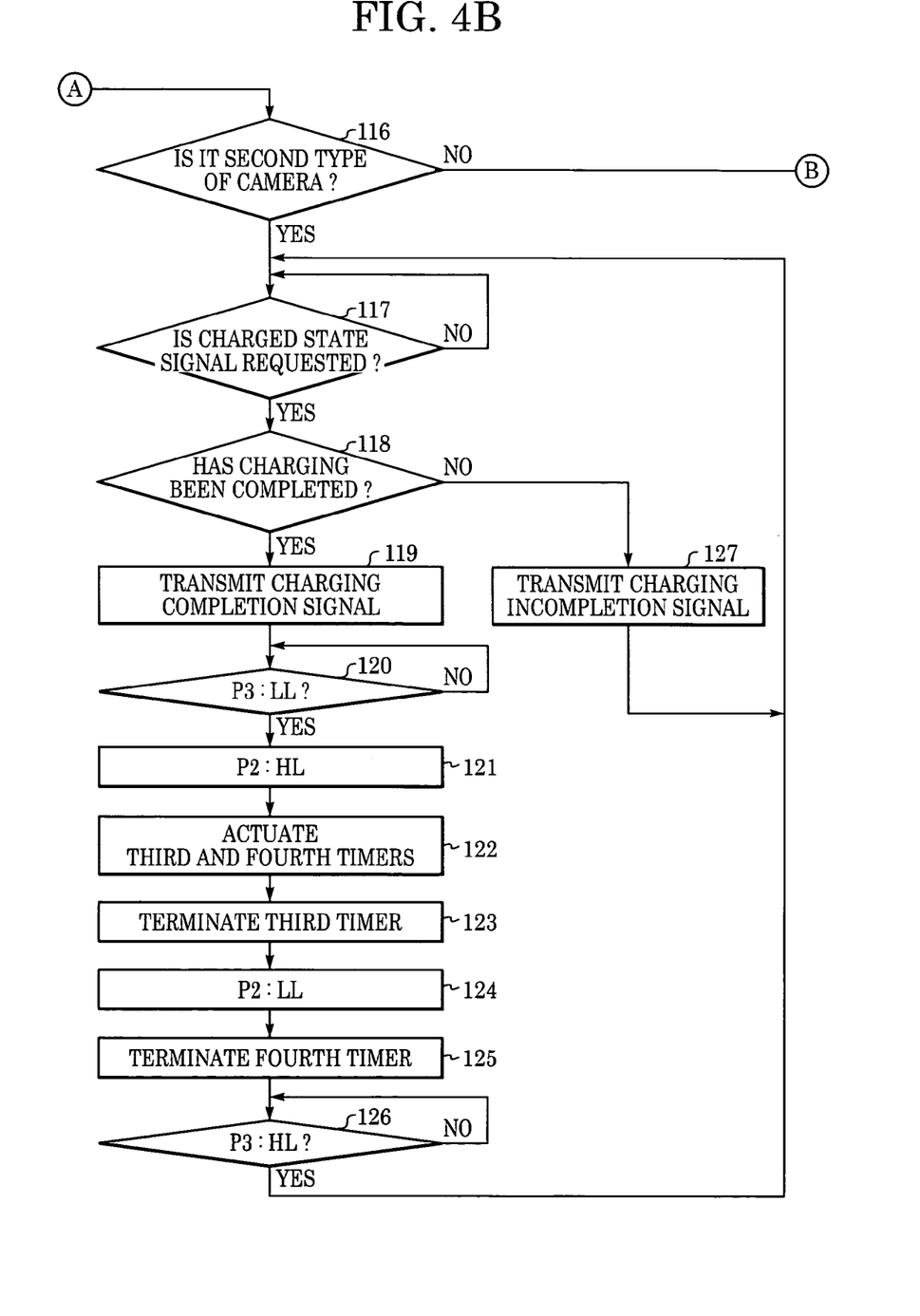
Figure 4C:
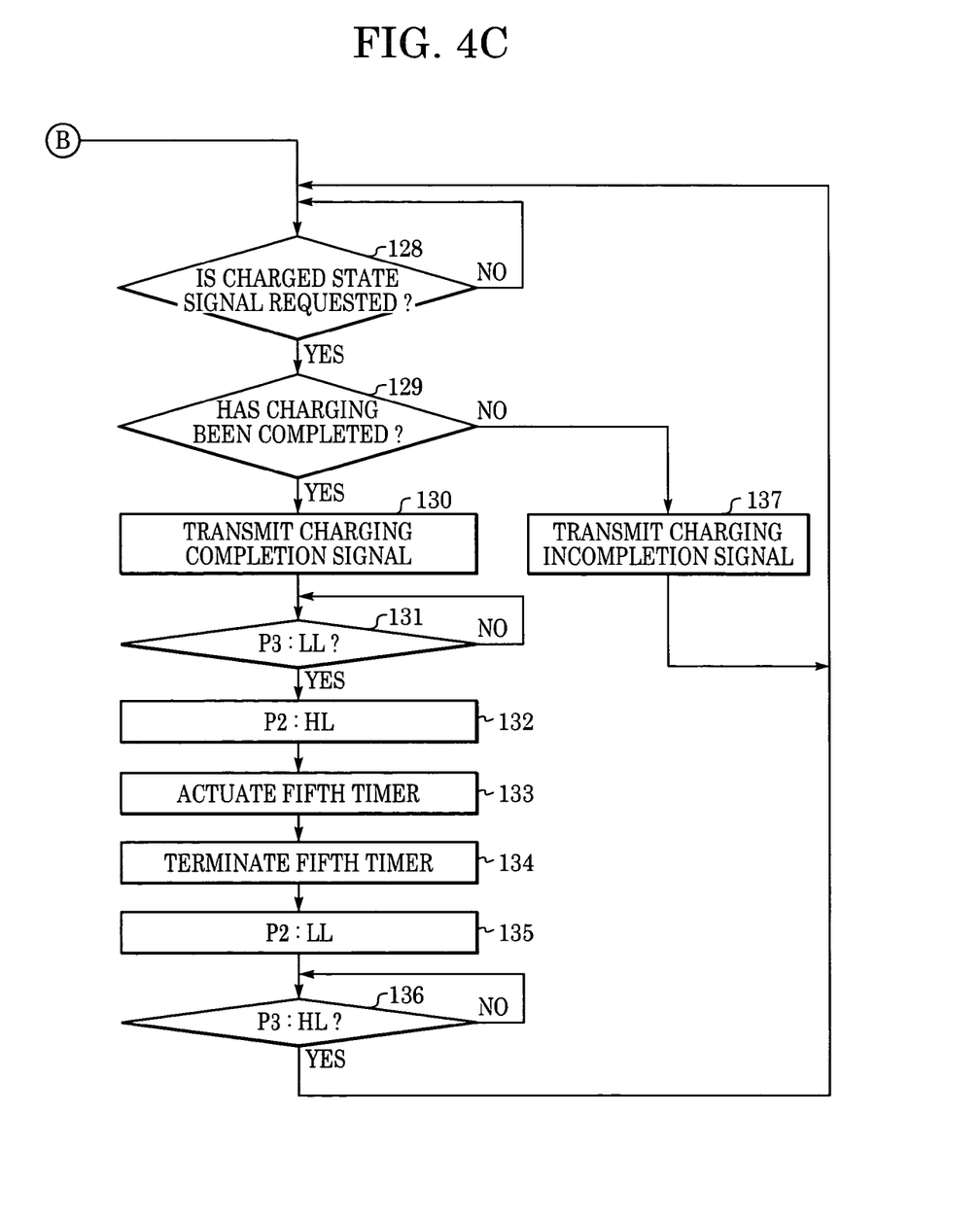

The actions to be performed by the microcomputer 5 included in the strobe unit in accordance with the first embodiment will be further described in conjunction with the flowchart of FIG. 4.

Processing of FIG. 4 begins at step 101 when the power switch 2 is turned on, and the strobe unit is started up. At this time, the port P2 of the microcomputer 5 is driven to a low level, the port P3 of the microcomputer 5 is driven to a high level, and the port P4 of the microcomputer is driven to the low level. At the next step 102, a request for a camera ID number that indicates the type of camera is issued to a camera connected to the strobe unit. At step 103, the camera ID number is received from the camera. At step 104, the camera connected is checked to see if it is of the first type. If the camera is verified to be of the first type, processing proceeds to step 105. If the camera is verified not to be of the first type, or if the camera is verified to be of the second or third type, processing proceeds to step 116.

If the camera is of the first type, processing proceeds from step 104 to step 105 where the camera is checked to see if it has issued a request for a charged-state signal that indicates the charged state of the main capacitor 17. If the charged-state signal is not requested, a standby state is established to continue until the charged-state signal is requested. Thereafter, when the charged-state signal is requested, processing proceeds to step 106. The main capacitor 17 is checked to see if charging thereof is completed. If charging has not been completed, processing proceeds to step 115 (described later). If the main capacitor 17 is in the charging-completed state, processing moves from step 106 to step 107 where a Charging Completed signal is transmitted to the camera. At the next step 108, the port P3 is checked to see if it is driven to a low level. If the port P3 is driven to the low level, that is, the mechanical synchro switch 41 in the first type of camera is on, processing moves to step 109. If the mechanical synchro switch 41 is not on, a standby state is established at step 108 to continue until the switch is turned on.

If the mechanical synchro switch 41 in the first type of camera is turned on, processing moves from step 108 to step 109 where the port P2 is driven to a high level. This brings the IGBT 12 to the on state. The flashlight emission initiating unit is activated, and the flash tube 15 initiates flashing. At the next step 110, first and second timers are started. The first timer is used to determine an on time during which the IGBT 12 that is included in the flashlight emission initiating unit is in the on state. The time elapsing until the timer completes countdown is set to 0.5 milliseconds. The second timer is used to prevent chattering of the mechanical synchro switch 41, and the time elapsing until the timer completes countdown is set to a chattering prevention time, e.g., 100 milliseconds. While the second timer is working, even if the synchro switch 41 causes chattering, flashing will not be repeated a plurality of times.

At the next step 111, a standby state is established to continue until the first timer completes countdown. When the first timer completes countdown, processing proceeds to step 112 where the port P2 is driven to a low level. At the next step 113, a standby state is established to continue until the second timer completes countdown. At the next step 114, the state of the port P3 is checked. That is, the mechanical synchro switch 41 is checked to see if it is open. If the port P3 is held at the low level, a standby state continues at step 114. Thereafter, when the port P3 is driven to a high level, processing returns to step 105.

As mentioned above, if charging is verified to remain uncompleted as determined at step 106, processing proceeds to step 115. At step 115, a Charging Uncompleted signal is transmitted to the camera, and processing returns to step 105. The same actions are then repeated.

If the camera is verified not to be of the first type at step 104, processing moves to step 116. At step 116, the camera connected is then checked to see if it is of the second type. If the camera is verified to be of the second type, processing proceeds to step 117. If the camera is verified not to be of the second type, that is, verified to be of the third type, processing proceeds to step 128.

If the camera is verified to be of the second type, processing moves from step 116 to step 117. The camera is checked to see if it has issued a request for a charged-state signal indicating the charged state of the main capacitor 17. If the charged-state signal is not requested, a standby state is established to continue until the charged-state signal is requested. Thereafter, when the charged-state signal is requested, processing moves to step 118. The main capacitor 17 is checked to see if charging thereof is completed. If charging is verified to not have been completed, processing moves to step 127 (described later). If charging is completed, processing moves to step 119 where a Charging Completed signal is transmitted to the camera. At the next step 120, the port P3 is checked to see if it is held at a low level. If the mechanical synchro switch 42 is not on (i.e., port P3 is not at a low level), a standby state is established at step 120 to continue until the switch is turned on. If the port P3 is held at the low level, that is, if the mechanical synchro switch 42 in the second type of camera is on, processing proceeds to step 121.

When the mechanical synchro switch 42 included in the second type of camera is turned on (yes at step 120), processing moves from step 120 to step 121 where the port P2 is driven to a high level. This brings the IGBT 12 to the on state. The flashlight emission initiating unit is activated, and the flash tube 15 initiates flashing. At the next step 122, third and fourth timers are started. The third timer is used to determine an on time during which the IGBT 12 that is included in the flashlight emission initiating unit remains in the on state, and the time required until the timer completes countdown is set to 0.5 milliseconds. The fourth timer is used to prevent chattering of the mechanical synchro switch 42, and the time required until the timer completes countdown is set to a chattering prevention time, e.g., 30 milliseconds, that is shorter than the time required until the first timer completes countdown. The chattering prevention time indicated by the fourth timer is not long enough to prevent chattering occurring in the first type of camera but it is long enough to prevent chattering occurring in the second type of camera. While the fourth timer is working, even if the synchro switch 42 causes chattering, flashing will not be repeated a plurality of times.

At the next step 123, a standby state is established to continue until the third timer completes countdown. When the third timer completes countdown, processing moves to step 124. The port P2 is driven to a low level. At the next step 125, a standby state is established to continue until the fourth timer completes countdown. At the next step 126, the state of the port P3 is checked. That is, the mechanical synchro switch 42 is checked to see if it is open. If the port P3 is held at the low level, the standby state is established at this step. Thereafter, when the port P3 is driven to a high level, processing returns to step 117.

As mentioned above, if charging is verified to remain uncompleted at step 118, processing proceeds to step 127. At step 127, a Charging Uncompleted signal is transmitted to the camera, and processing returns to step 117. The foregoing actions are then repeated.

If the camera is verified not to be of the second type at step 116, that is, if the camera is verified to be of the third type, processing moves to step 128 where a standby state is established to continue until the camera issues a request for a charged-state signal indicating the charged state of the main capacitor 17. Thereafter, when the charged-state signal is requested, processing moves from step 128 to step 129. The main capacitor 17 is checked to see if charging thereof is completed. If charging is verified to not have been completed, processing moves to step 137. If the main capacitor is verified to be in the charging completed state, processing moves from step 129 to step 130 where a Charging Completed signal is transmitted to the camera.

At the next step 131, the port P3 is checked to see if it is held at a low level. If the port P3 is held at a high level, that is, the semiconductor synchro switch 39 included in the third type of camera is off, a standby state is established to continue until the semiconductor synchro switch 39 is turned on. Thereafter, when the semiconductor synchro switch 39 is turned on (P3 is held at a low level), processing moves to step 132. At step 132, the port P2 is then driven to the high level. This brings the IGBT 12 to the on state. The flashlight emission initiating unit is activated, and the flash tube 15 initiates flashing. At the next step 133, a fifth timer is started. Similarly to the first timer, the fifth timer is used to determine the on time during which the IGBT 12 included in the flashlight emission initiating unit remains in the on state. In exemplary embodiments, the time required until the fifth timer completes countdown is, to the same as the first timer, set to 0.5 milliseconds.

At the next step 134, a standby state is established to continue until the fifth timer completes countdown. When the fifth timer completes countdown, processing proceeds to step 135 where the port P2 is driven to a low level. At the next step 136, the state of the port P3 is checked. That is, at step 136, the semiconductor synchro switch 39 is checked to see if it is off.

If the port P3 is held at the low level, a standby state is established to continue until the port P3 is driven to a high level. When the port P3 is driven to the high level, processing returns to step 128.

As mentioned above, if charging is verified to have not been completed at step 129, processing moves to step 137. At step 137, a Charging Uncompleted signal is transmitted to the camera, and control is returned to step 128. The same actions are then repeated.

In the foregoing processing shown in FIG. 4, if the power switch 2 is turned off and then turned on again, the strobe unit is restarted (at step 101).

As described above, the type of camera is checked at step 104 and step 116. Consequently, the synchro switch included in a camera is checked to see if it is a mechanical synchro switch or a semiconductor synchro switch. If the mechanical synchro switch is included, the length of a chattering time is checked. These actions are implemented in a checking unit included in the microcomputer 5. Moreover, if the first type of camera is employed, step 108 to step 113 are needed to prevent chattering. More particularly, the step 108 to step 113 are needed to prevent chattering by ignoring the repetition of the on and off states of the mechanical synchro switch 41 during the working time of the second timer (100 milliseconds). If the second type of camera is employed, step 120 to step 125 are needed to prevent chattering, or specifically, to prevent chattering by ignoring the repetition of the on and off states of the mechanical synchro switch 42 during the working time of the fourth timer (30 milliseconds). The actions at these steps are implemented in a chattering preventing unit included in the microcomputer 5.

Figure 5:
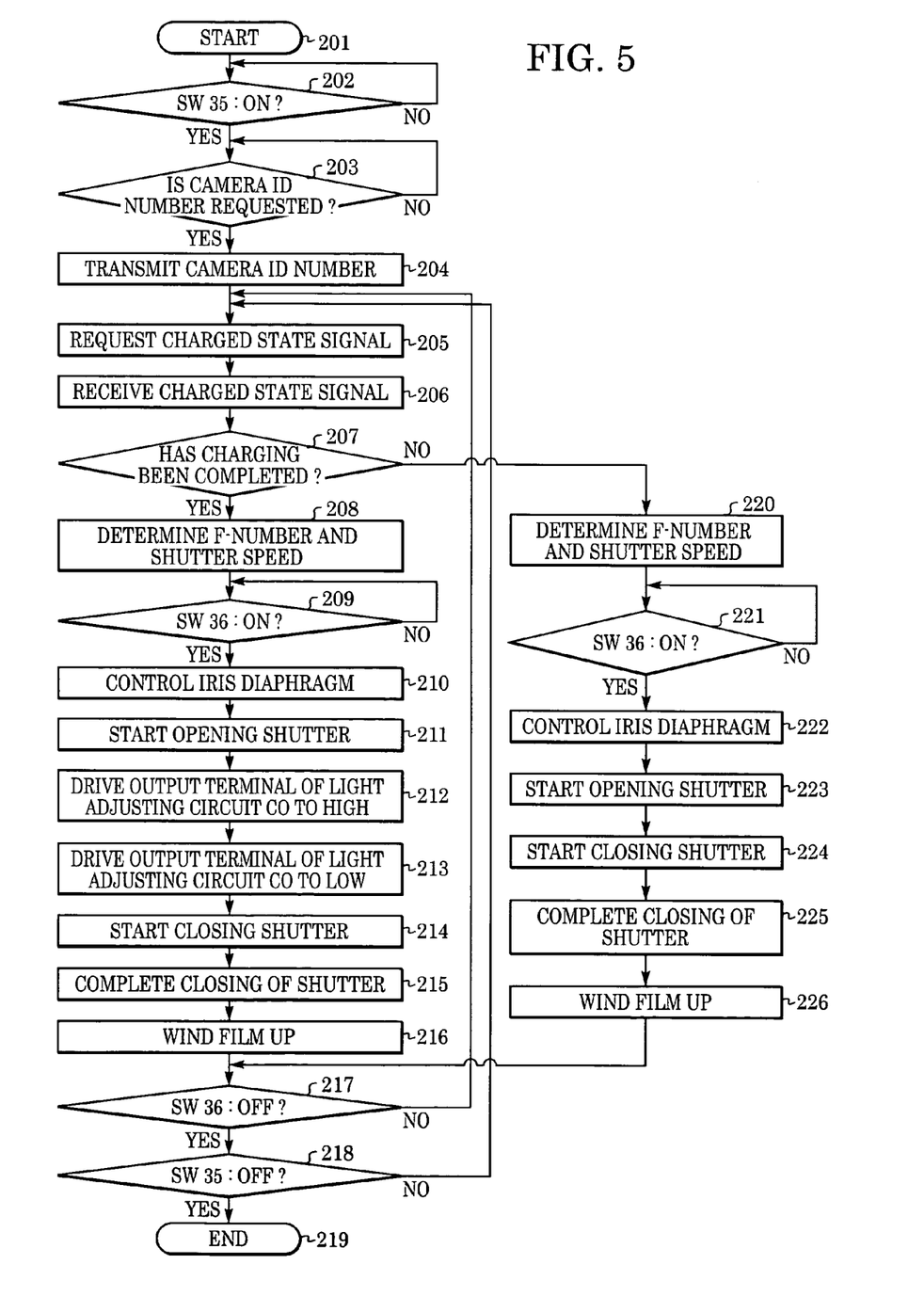
FIG. 5 is a flowchart illustrating actions to be performed in the first type of camera relevant to the embodiment of the present invention.

Actions to be performed in the microcomputer 30 included in the first type of camera or the microcomputer 50 included in the second type of camera are described next in conjunction with the flowchart of FIG. 5.

At step 201, when the power switch that is not shown is turned on, the microcomputer is started. At this time, the mode designation circuit 34 designates a continuous photography mode. At the next step 202, the state of the switch 35 that is turned on with the shutter button of a camera pressed halfway is checked. If the switch 35 is off, a standby state is established to continue until the switch 35 is turned on. Thereafter, when the switch 35 is turned on, processing proceeds to step 203. At step 203, the strobe unit is checked to see if it has issued a request for an ID number indicating the type of camera. If the ID number is not requested, a standby state is established to continue until the ID number is requested. If the ID number is requested, processing proceeds to step 204.

At step 204, the camera ID number is transmitted to the strobe unit. At the next step 205, a request for a charged-state signal indicating whether charging of the main capacitor 17 is completed or remains uncompleted is issued to the strobe unit. At the next step 206, the charged-state signal is received from the strobe unit. At the next step 207, the signal received at step 206 is checked. If the main capacitor 17 in the strobe unit is not in the charging-completed state, processing moves from step 207 to step 220. If the main capacitor 17 is in the charging-completed state, processing moves from step 207 to step 208. At step 208, the photometry unit (not shown) is activated in order to determine an f-number and a shutter speed suitable for flash photography. At step 209, the state of the switch 36 that is turned on with the shutter button of a camera fully pressed is checked. If the switch 36 is off, a standby state is established to continue until the switch 36 is turned on. Thereafter, when the switch 36 is turned on, processing proceeds to step 210 where the iris diaphragm control circuit 31 controls the iris diaphragm (not shown) according to the f-number determined at step 208. At the next step 211, the shutter control circuit 32 initiates opening of the shutter (not shown). At the next step 212, the light adjustment circuit 40 is started, and the output terminal CO thereof is driven from a low level to a high level. Thereafter, when the shutter is fully opened, the synchro switch 41 or 42 is turned on. Flashing of the flash tube 15 included in the strobe unit is initiated.

At the next step 213, the output terminal CO of the light adjustment circuit 40 is driven from the high level to the low level. This is because the light adjustment circuit 40 has measured light reflected from an object illuminated with flashlight emitted from the flash tube 15, and the measured amount of light has reached a predetermined value. At the next step 214, the shutter control circuit 32 initiates closing of the shutter according to the shutter speed determined at step 208. At the next step 215, the closing of the shutter is completed. At the next step 216, the film feed circuit 33 winds up a film. At the next step 217, the switch 36 is checked to see if it is off. If the switch 36 is off, processing proceeds to step 218. If the switch 36 is on, processing returns to step 205.

If the switch 36 is off, processing moves from step 217 to step 218 where the switch 35 is checked to see if it is off. If the switch 35 is on, processing returns to step 205. If the switch 35 is off, processing proceeds to step 219 where the series of actions is terminated.

As mentioned above, if charging is verified to remain uncompleted at step 207, processing moves to step 220. At step 220, the photometry circuit (not shown) is activated in order to determine an f-number and a shutter speed suitable for natural-light photography. At the next step 221, the state of the switch 36 is checked. If the switch 36 is off, a standby state is established to continue until the switch is turned on. When the switch 36 is turned on, processing proceeds to step 222. At step 222, the iris diaphragm control circuit 31 controls the iris diaphragm (not shown) according to the f-number determined at step 220. At the next step 223, the shutter control circuit 32 initiates opening of the shutter (not shown). At the next step 224, the shutter control circuit 32 initiates closing of the shutter according to the shutter speed determined at step 220. At the next step 225, the closing of the shutter is completed. At step 226, the film feed circuit 33 winds up a film. Processing then proceeds to step 217 (described above).

Figure 6:
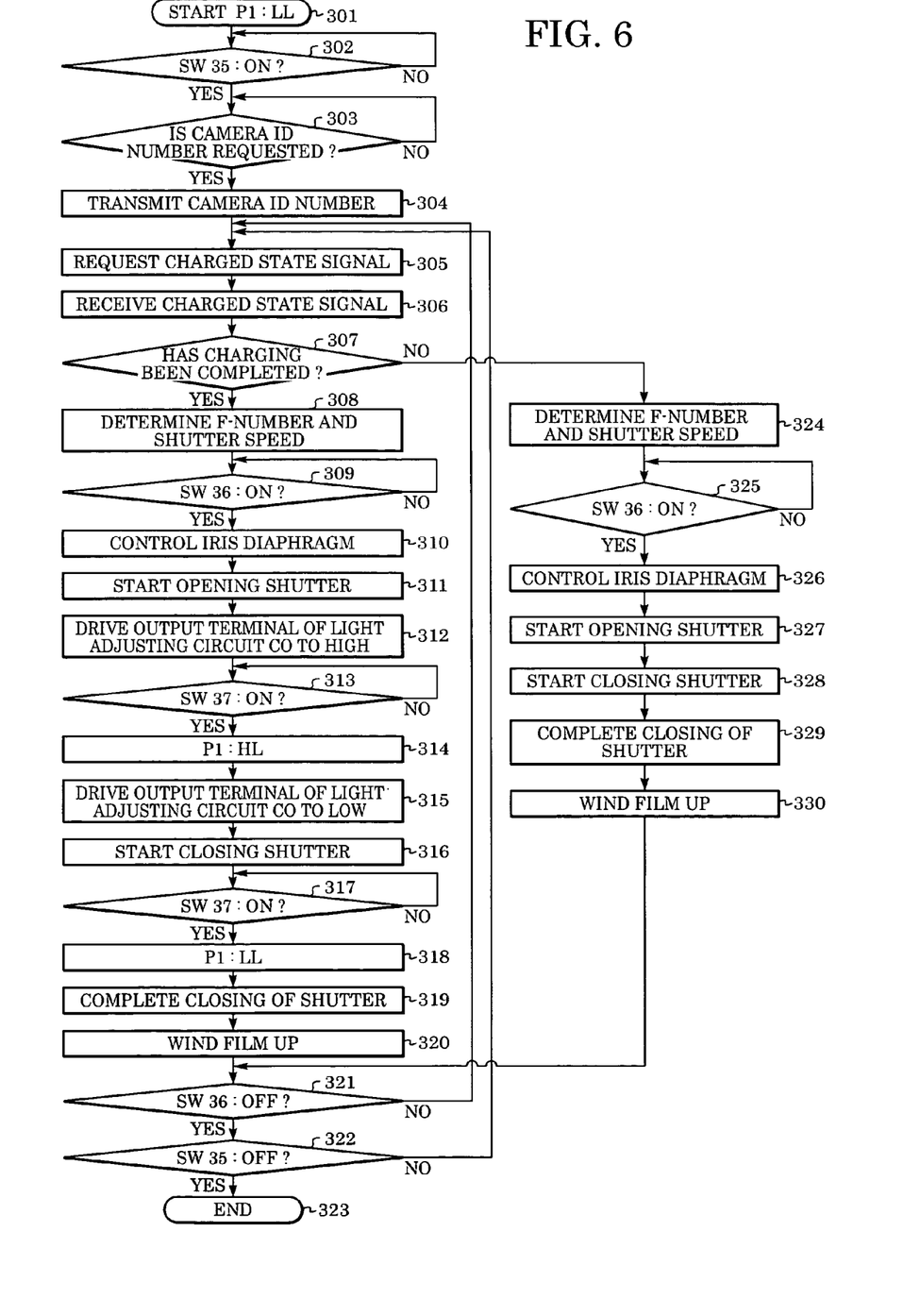
FIG. 6 is a flowchart illustrating actions to be performed in the third type of camera relevant to the embodiment of the present invention.

Actions to be performed by the microcomputer 60 included in the third type of camera are described next in conjunction with the flowchart of FIG. 6.

The power switch that is not shown is turned on at step 301, and the microcomputer is started. At this time, the port P1 is driven to a low level. In this state, the mode designation circuit 34 designates a continuous photography mode. At the next step 302, the state of the switch 35 that is turned on with the shutter button on a camera (not shown) pressed halfway is checked. If the switch 35 is off, a standby state is established to continue until the switch 35 is turned on. When the switch 35 is turned on, processing proceeds to step 303 where the strobe unit is checked to see if it has issued a request for an ID number indicating the type of camera. If no request is issued, processing returns to step 303 to wait for the issuance of a request for a camera number ID. If the request has been issued, processing moves from step 303 to step 304.

If a request for an ID number indicating the type of camera has been issued from the strobe unit, processing moves from step 303 to step 304. The camera ID number is transmitted to the strobe unit. At step 305, a request for a charged-state signal indicating whether charging of the main capacitor remains uncompleted or is completed is issued to the strobe unit. At the next step 306, the charged-state signal is received.

At the next step 307, the signal received at the step 306 is checked. If the main capacitor 17 in the strobe unit is not in a charging-completed state, processing moves from step 307 to step 324. If the strobe unit is in the charging-completed state, processing moves from step 307 to step 308 where the photometry circuit (not shown) is activated in order to determine an f-number and a shutter speed suitable for flash photography.

At the next step 309, the state of the switch 36 that is turned on with the shutter button on the camera (not shown) fully pressed is checked. If the switch 36 is off, a standby state is established to continue until the switch is turned on. When the switch 36 is turned on, processing proceeds to step 310 where the iris diaphragm control circuit 31 controls the iris diaphragm (not shown) according to the f-number determined at step 308. At step 311, the shutter control circuit 32 initiates opening of the shutter (not shown). At the next step 312, the light adjustment circuit 40 is started and the output terminal CO thereof is driven from a low level to a high level. At the next step 313, the state of the switch 37 that is turned on with the shutter fully opened is checked. If the switch 37 is off, the standby state is established to continue until the switch 37 is turned on. When the switch 37 is turned on, processing proceeds to step 314 where the port P1 is driven to the high level. With the voltage having the high level, the semiconductor synchro switch 39 included in the camera is turned on. This causes the strobe unit to initiate flashing.

At the next step 315, the output terminal CO of the light adjustment circuit 40 is driven from the high level to the low level. This is because the light adjustment circuit 40 has measured light reflected from an object illuminated with flashlight emitted from the flash tube 15, and the measured amount of light has reached a predetermined value. At the next step 316, the shutter control circuit 32 initiates closing of the shutter according to the shutter speed determined at step 308. At the next step 317, the state of the switch 37 is checked. If the switch 37 is off, a standby state is established to continue until the switch is turned on. When the switch 37 is turned on, processing proceeds to step 318 where the port P1 is driven to the low level. At the next step 319, the closing of the shutter is completed. At the next step 320, the film feed circuit 33 winds up a film. Processing then proceeds to step 321 where the switch 36 is checked to see if it is off. If the switch 36 is on, processing returns to step 305. On the other hand, if the switch 36 is off, processing proceeds to step 322 where the switch 35 is checked to see if it is off. If the switch 35 is on, processing returns to step 305. If the switch 35 is off, processing proceeds to step 323 and the series of actions is terminated.

As mentioned above, if at step 307, charging is verified to have not been completed, processing moves to step 324. At step 324, the photometry circuit (not shown) is activated in order to determine an f-number and a shutter speed suitable for natural-light photography. At the next step 325, the state of the switch 36 is checked. If the switch 36 is off, a standby state is established to continue until the switch is turned on. When the switch 36 is turned on, processing moves to step 326 where the iris diaphragm control circuit 31 controls the iris diaphragm (not shown) according to the f-number determined at step 324. At the next step 327, the shutter control circuit 32 initiates opening of the shutter (not shown). At the next step 328, the shutter control circuit 32 initiates closing of the shutter according to the shutter speed determined at step 324. At the next step 329, the closing of the shutter is completed. At step 330, the film feed circuit 33 winds up a film. Processing then proceeds to step 321 (described above).

In the foregoing embodiment, the microcomputer 5 included in the strobe unit checks the type of camera connected (steps 104 and 116 in FIG. 4). If the camera is verified to be of the first type having the mechanical synchro switch 41, the chattering preventing unit (steps 108 to 113) is enabled. If the camera is verified to be of the second type having the mechanical synchro switch 42, the chattering preventing unit (steps 120 to 125) is enabled to act during a chattering prevention time shorter than the time determined for the first type of camera. If the camera is verified to be of the third type of camera having the semiconductor synchro switch 39, the chattering preventing unit is disabled. Consequently, a switch member to be used to enable or disable the chattering preventing unit need not be included, but flash photography can be automatically achieved properly according to a camera employed.

Namely, flashlight can be emitted according to whether chattering occurs or according to the length of a chattering time.

Moreover, since the chattering preventing unit is enabled or disabled as mentioned above, or because the switch member to be used to enable the chattering preventing unit during a different chattering prevention time need not be included, the attempt to compactly design a strobe unit or a camera at a low cost will not be discouraged.

Moreover, owing to the aforesaid configuration, a strobe unit can be constructed so that the number of times of photography per unit time to be attained by the third type of camera having the semiconductor synchro switch 39 or the second type of camera causing chattering for a short period of time can be made larger than that by the first type of camera having the mechanical synchro switch 41 whose chattering continues for a long period of time. Moreover, a photography system can be constructed with a combination of a camera and a strobe unit which provides the same advantages as the mentioned ones.

In exemplary embodiments of the present invention, an IGBT is adopted as the semiconductor switch included in the third type of camera. Alternatively, an FET (Field-Effect Transistor), a bipolar transistor, an SCR (Silicon Controlled Rectifier), or a TRIA (Transmit Receive Isolation Assembly) will do. Nevertheless, the same advantages can be provided.

Moreover, a camera employing a film is adopted as the first, second, and third types of cameras. Alternatively, an electronic camera employing an imaging device may be adopted as the first, second, and third types of cameras. Otherwise, the camera employing a film and the electronic camera may be adopted as the first, second, and third types of cameras.

Furthermore, a program for performing the actions described herein may be supplied to a system or apparatus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A strobe unit comprising:
a flashlight emission initiating unit that transmits a signal to a flashing unit which causes the flashing unit to flash;
a chattering preventing unit connected to the flashlight emission initiating unit;

a communication terminal connectable to an image sensing apparatus;

a checking unit connected to the communication terminal that checks a type of synchro switch included in the image sensing apparatus through transfer of information with the image sensing apparatus through the communication terminal; and a control unit connected to the chattering preventing unit and the checking unit that controls the chattering preventing unit based on a result provided by the checking unit, wherein the control unit inactivates the chattering preventing unit based on the result provided by the checking unit, and wherein if the checking unit determines that the synchro switch included in the image sensing apparatus is a switch that does not cause chattering, the control unit inactivates the chattering preventing unit.

2. A strobe unit comprising:

a flashlight emission initiating unit that transmits a signal to a flashing unit which causes the flashing unit to flash;

a chattering preventing unit connected to the flashlight emission initiating unit;

a communication terminal connectable to an image sensing apparatus;

a checking unit connected to the communication terminal that checks a type of synchro switch included in the image sensing apparatus through transfer of information with the image sensing apparatus through the communication terminal; and a control unit connected to the chattering preventing unit and the checking unit that controls the chattering preventing unit based on a result provided by the checking unit, wherein when the control unit determines that the synchro switch included in the image sensing apparatus is a switch that does not cause chattering, the control unit sets an upper limit of a number of times of flash photography per unit of time to be attained by the image sensing apparatus to a larger value than a value set when the synchro switch included in the image sensing apparatus is a switch that causes chattering.

3. A strobe unit comprising:

a flashlight emission initiating unit that transmits a signal to a flashing unit which causes the flashing unit to flash;

a chattering preventing unit connected to the flashlight emission initiating unit;

a communication terminal connectable to an image sensing apparatus;

a checking unit connected to the communication terminal that checks a type of synchro switch included in the image sensing apparatus through transfer of information with the image sensing apparatus through the communication terminal; and a control unit connected to the chattering preventing unit and the checking unit that controls the chattering preventing unit based on a result provided by the checking unit, wherein the control unit designates a chattering prevention time during which the chattering preventing unit works based on the result provided by the checking unit.

4. A strobe unit according to claim 3, wherein when the checking unit determines that the synchro switch included in the image sensing apparatus is a switch that causes chattering, the control unit designates a chattering prevention time during which the chattering preventing unit works based on a result of checking a chattering time during which chattering of the synchro switch is under way.

5. A strobe unit according to claim 4, wherein when a chattering time during which chattering of the synchro switch checked by the checking unit is under way is shorter, the control unit sets the upper limit of the number of times of flash photography per unit time, which is attained by the image sensing apparatus, to a larger value.

6. A strobe unit control method for a strobe unit connectable to an image sensing apparatus, the strobe unit control method comprising:

receiving information from the image sensing apparatus comprising information for determining a type of synchro switch included in the image sensing apparatus;

determining the type of synchro switch included in the image sensing apparatus; and determining parameters for preventing chattering based on the information received from the image sensing apparatus, wherein the parameters for preventing chattering comprise an inactivation parameter indicating that preventing chattering is not required based on the type of synchro switch determined to be in the image sensing apparatus, and wherein if the type of synchro switch determined to be in the image sensing apparatus is a type of switch that does not cause chattering, the parameters for preventing chattering comprise the inactivation parameter.

7. A strobe unit control method for a strobe unit connectable to an image sensing apparatus, the strobe unit control method comprising:

receiving information from the image sensing apparatus comprising information for determining a type of synchro switch included in the image sensing apparatus;

determining the type of synchro switch included in the image sensing apparatus; and determining parameters for preventing chattering based on the information received from the image sensing apparatus, wherein the parameters for preventing chattering comprise a chattering prevention time, determining parameters for preventing chattering comprises determining the chattering prevention time based on the type of synchro switch determined to be in the image sensing apparatus, and the strobe unit control method further comprises preventing chattering for the chattering prevention time.

8. A strobe unit control method according to claim 7, further comprising:

determining if chattering of the synchro switch included in the image sensing apparatus is under way; and if chattering of the synchro switch included in the image sensing apparatus is under way, determining the chattering prevention time is based on the type of synchro switch determined to be included in the image sensing apparatus and a chattering time which the synchro switch included in the image sensing apparatus has been under way.

* * * * *